United States Patent [19]
Fujisaki et al.

[11] Patent Number: 5,331,392
[45] Date of Patent: Jul. 19, 1994

[54] METHOD OF IDENTIFYING AN OPTICAL CABLE

[75] Inventors: Akira Fujisaki; Shintaro Sentsui, both of Tokyo, Japan

[73] Assignee: The Furukawa Electric Co., Ltd., Tokyo, Japan

[21] Appl. No.: 915,813

[22] PCT Filed: Nov. 29, 1991

[86] PCT No.: PCT/JP91/01656
§ 371 Date: Jul. 24, 1992
§ 102(e) Date: Jul. 24, 1992

[87] PCT Pub. No.: WO92/09873
PCT Pub. Date: Jun. 11, 1992

[30] Foreign Application Priority Data
Nov. 30, 1990 [JP] Japan .................. 2-339253

[51] Int. Cl.$^5$ .................................. G01N 21/00
[52] U.S. Cl. ................... 356/73.1; 250/227.17
[58] Field of Search ............. 356/73.1; 250/227.17

[56] References Cited
U.S. PATENT DOCUMENTS
4,840,482  6/1989  Shigematsu et al. ........ 356/73.1
5,202,746  4/1993  Sentsui et al. ............ 356/73.1

FOREIGN PATENT DOCUMENTS
61-109008   5/1986  Japan .
63-145939   6/1988  Japan .
63-298305  12/1988  Japan .
1-101504    4/1989  Japan .
2-230105    9/1990  Japan .
2-230106    9/1990  Japan .

Primary Examiner—Robert J. Warden
Assistant Examiner—L. M. Crawford
Attorney, Agent, or Firm—Jacobson, Price, Holman & Stern

[57] ABSTRACT

A method of identifying a particular optical cable C1 out of a set of optical cables C1, C2 by applying an external signal by means of a signal applying apparatus 16 while an optical signal is transmitted from means for transmitting optical signals and monitoring changes in the signals received by means for receiving optical signals. Since the difference in the frequencies and the levels of the higher harmonics generated by the external signal in the particular cable and the other cable(s) that are laid so close to one another that the phenomenon of cross talk remarkably appears, the optical cable in question can be identified almost without fail.

4 Claims, 2 Drawing Sheets

METHOD OF IDENTIFYING AN OPTICAL CABLE

BACKGROUND OF THE INVENTION

1. Field of Invention

This invention relates to a method of identifying a particular optical cable out of a number of similar optical cables on an installation site.

2. Prior Art

In modern telecommunication systems, optical cables are housed in ducts and conduits and laid along the route of installation.

With the recent development of telecommunication networks, a large number of different optical cables are often laid along a single route of installation to produce a congested condition of cables. Works for branching and/or replacing the installed cables are frequently required.

FIG. 4 of the accompanying drawings schematically illustrates a typical telecommunication network comprising central stations O1, relay stations O2 and terminal stations O3 interconnected by means of a large number of optical cables C, which are often ramified, looped and star-connected.

Since many of these optical cables resemble one another, skilled workers feel it difficult to single out a particular optical cable that needs to be branched or replaced out of a number of cables that have been laid in a same route of installation.

In an attempt to remedy this problem, Laid-Open Japanese Patent Nos. 2-230105 and 1-230106 propose methods of identifying a particular optical cable by utilizing fluctuation of polarized light in a single mode optical fiber.

Referring to FIG. 5, with these known methods, polarized light is transmitted through a single mode optical fiber of an optical cable C from a light source 1 of a light source station while an external signal (such as mechanical vibration) is applied to the optical cable C at a work site by means of a signal application device 2 so that any fluctuation in the level of polarized light caused by the external signal may be detected to identify the optical fiber by a photodetector 3 as the light is received by a light receiving device 4 at a detecting station.

More specifically, while the operator of the light source station applies a given signal to each optical cable and the operator of the detecting station monitors the reception of the signal, the operator on the work site sequentially applies an external signal to the optical cables laid there on a one by one basis and, each time an external signal is applied to an optical cable, the operator at the work site and his colleague at the detecting station talk over through a radio communication channel, using, for instance, a pair of transceiver sets, to make sure if the optical cable in question is detected or not.

As the operation of sequentially applying an external signal to the optical cables laid in the work site proceeds on a one by one basis, the operator there will eventually come across the optical cable in question to apply a signal to it and the operator monitoring the signals at the detecting station will detect the cable carrying a fluctuated signal.

Then, the operator at the detecting station notifies his colleague at the work site that the cable to which an external signal is applied last time is the optical cable in question so that the latter can identify the optical cable.

Now, the optical cable is identified and the operator on the work site can proceed to a predetermined work to be conducted on the cable in question.

Since the above described method of utilizing fluctuation of polarized light involves mechanical vibration which is applied to optical cables as an external signal, the applied external vibration can affect the optical cables laid in the vicinity of the source of vibration to give rise to a phenomenon of cross talk.

In other words, the external signal applied to a particular optical cable can also be given to any of the optical cables laid in the vicinity and produce a condition where identification of cables is impossible or misidentification of cables occurs.

Since the phenomenon of cross talk appears when cables are brought to contact with each other, it may seem that such a phenomenon can be avoided when cables are laid in a manner that eliminates any possibility of mutual contact.

However, laying optical cables under a condition where the possibility of mutual contact is completely eliminated is illogical and irrational from the view point of boosting high density cable installation that has encouraged the development of optical cables.

Besides, in view of the optical cables of existing cable networks that stretch over hundreds of thousands kilometers, it is highly unrealistic to rearrange them under a non-contact condition.

Consequently, it is impossible under the current condition of optical cable installation to totally eliminate the possibility of misidentification of cables when the above described technique of utilizing fluctuation of polarized light is used for identification of particular cables.

SUMMARY OF THE INVENTION

In view of the above discussed technical problem, it is therefore an object of the present invention to provide a method of identifying a particular optical cable out of a number of similar optical cables on the installation site even when the cables are under a mutual contact condition.

According to the invention, the above object is achieved by providing a method of identifying a particular optical cable characterized in that it comprises steps of connecting means for transmitting optical signals and means for receiving optical signals to an end or respective opposite ends of a set of optical cables, a signal applying apparatus being provided at an intermediary point of the optical cables along the longitudinal direction, applying sequentially an external signal (mechanical vibration) to the optical cables on one by one basis at the intermediary point thereof along the longitudinal direction by way of said signal applying apparatus when polarized light is transmitted by the means for transmitting optical signals and received by the means for receiving optical signals through the optical cables and identifying a particular optical cable out of the set of optical cables subjected to an external signal by sensing and comparing the output levels of secondary and higher harmonics in the external signals transmitted though the optical cables including said particular cable and those surrounding it in terms of cross talk of the external signal.

It should be noted that higher harmonics of an external signal applied to a particular optical cable hardly gives rise to the phenomenon of cross talk and superposition in the surrounding optical cables.

If any cross talk and superposition of the higher harmonics ever occur in the surrounding optical cables, the harmonics in those surrounding cables undergo an upward shift in the component frequencies.

Thus, by sensing and comparing the output levels of higher harmonics in the external signals transmitted through given optical cables, the particular optical cable to which an external signal is applied can be identified without fail.

In utilizing the method of identifying a particular optical cable out of a number of optical cables according to the invention, both the means for transmitting optical signals and the means for receiving optical signals may be connected to an end of the cables or, alternatively, to respective opposite ends of the cables.

When both the means for transmitting optical signals and the means for receiving optical signals are connected to an end of a set of cables, an additional optical cable which is designed to feed back optical signals is connected to the other end of each cable.

DETAILED DESCRIPTION OF THE PREFERRED EMBODIMENT OF THE INVENTION

Now, the present invention will be described by referring to the accompanying drawings that illustrate the best mode of carrying out the invention.

Figure 1:
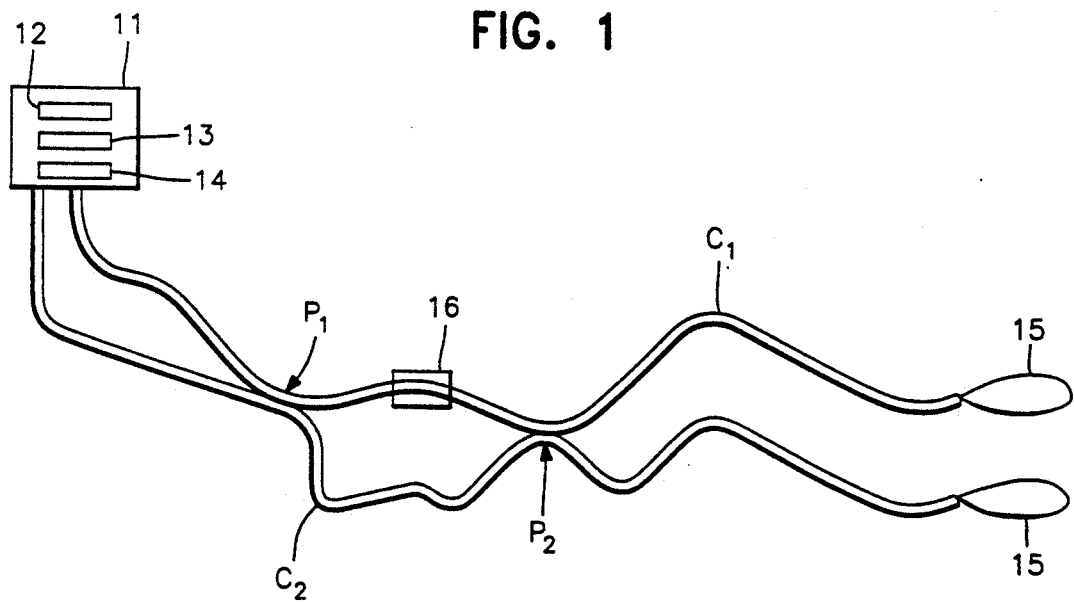
FIG. 1 is a schematic illustration of the method and apparatus for identifying a particular optical cable according to the invention.
Figure 4:
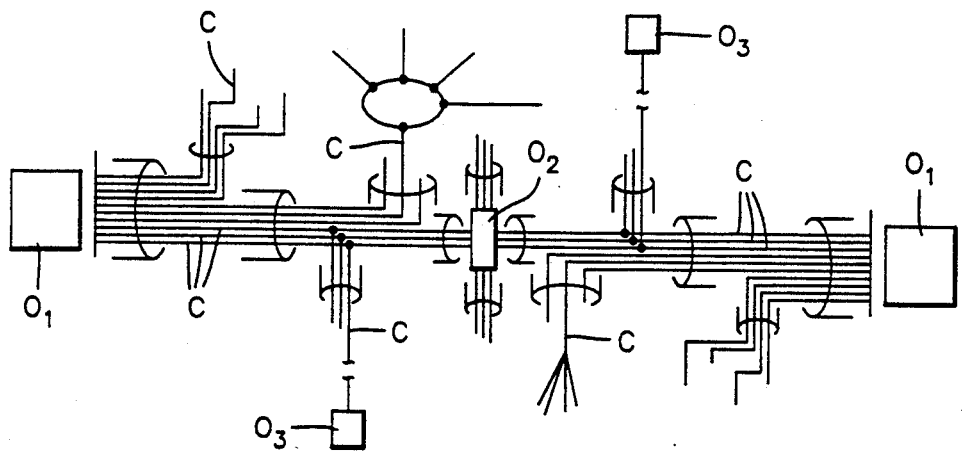
FIG. 4 is a schematic illustration of an optical cable network.
Figure 5:
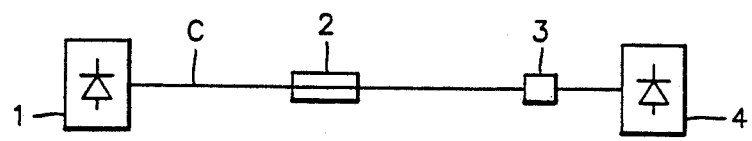
FIG. 5 is a schematic illustration of a system according to the prior art.

Referring first to FIG. 1, C1 and C2 respectively denote optical cables, 11 is a transmitter/receiver set for transmitting and receiving optical signals and 15 are optical fibers designed to feed back optical signals while 16 denotes a signal applying apparatus.

Each of the optical cables C1, C2 comprises a large number of optical fibers, including at least a single mode optical fiber to be used for signal transmission and a single mode optical fiber to be used for signal reception, which will be described later.

The optical cables C1, C2 are laid along a single route and housed in a duct or conduit. They are disposed in contact with each other at points P1 and P2.

The transmitter/receiver set 11 comprises a light source 12, a light receiving device 13, a photodetector 14 and other devices and is optically connected to an end of each of the optical cables C1, C2.

More specifically, the light source 12 is connected to the transmission terminal of each of the single mode optical fibers disposed in the optical cables C1, C2 and the photodetector 14 is connected to the reception terminal of each of the single mode optical fibers while the light receiving device 13 and the photodetector 14 are connected with each other.

The optical fibers 15 are also of a single mode type and connected to the respective single mode optical fibers for signal transmission and those for signal reception at the respective other ends of the optical cables C1, C2.

The signal applying apparatus 16 typically comprises a piezoelectric element for generating ultrasonic vibration as mechanical vibration.

Now, assume that the optical cable C1 is the cable to be identified and the signal applying apparatus 16 is fitted to the optical cable C1 at an intermediary point along the longitudinal direction.

The intermediary point of the optical cable C1 where the signal applying apparatus 16 is fitted is a work site where the optical cable needs to be identified.

Referring to FIG. 1, in an experiment, polarized light was transmitted from the light source 12 of the transmitter/receiver set 11 by way of the single mode optical fibers for signal transmission of the optical cables C1, C2, the optical fibers for signal feedback 15 and the photodetector 14 of the transmitter/receiver set 11 and received by the light receiving device 13, while mechanical vibration (340 Hz) was applied to the optical cable C1 as an external signal at an intermediary point along the longitudinal direction in order to identify the optical cable C1.

Figure 2:
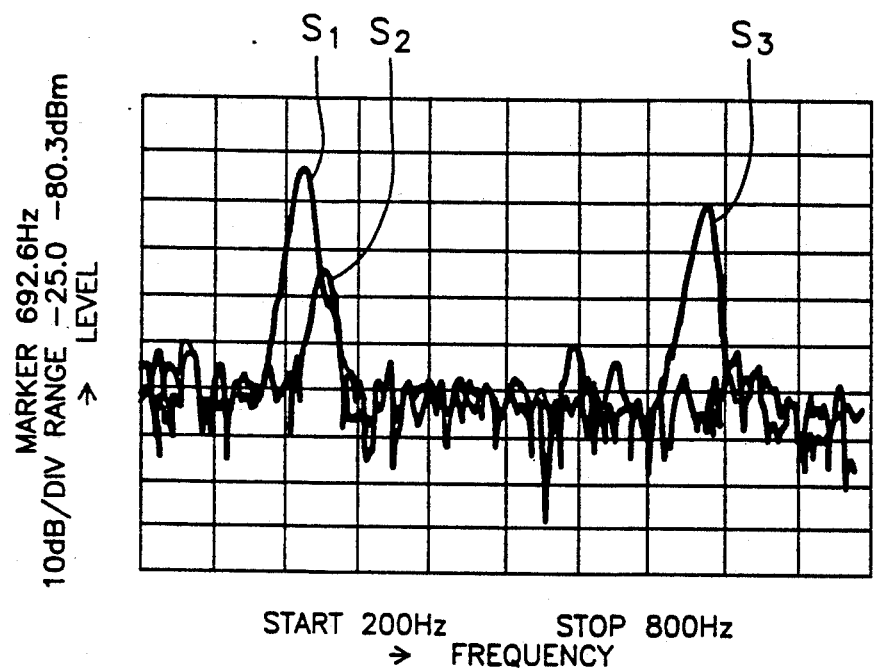
FIG. 2 is a frequency spectrogram of a signal received by means for receiving optical signals by using the method of the present invention.

FIG. 2 shows a frequency spectrogram of the optical output signal of the photodetector 14 obtained in the experiment.

In FIG. 2, S1 denotes the fundamental harmonic of the 340 Hz signal applied to the optical cable C1 to be identified, S2 is the higher harmonics of the signal detected in the optical cable C1 and S3 is the fundamental harmonic of the signal detected in the adjacent cable C2.

As clearly seen from FIG. 2, the peak frequencies of the fundamental harmonics S1 and S2 slightly differ from each other, the latter having a peak frequency higher than that of the former by approximately 10 Hz.

Figure 3:
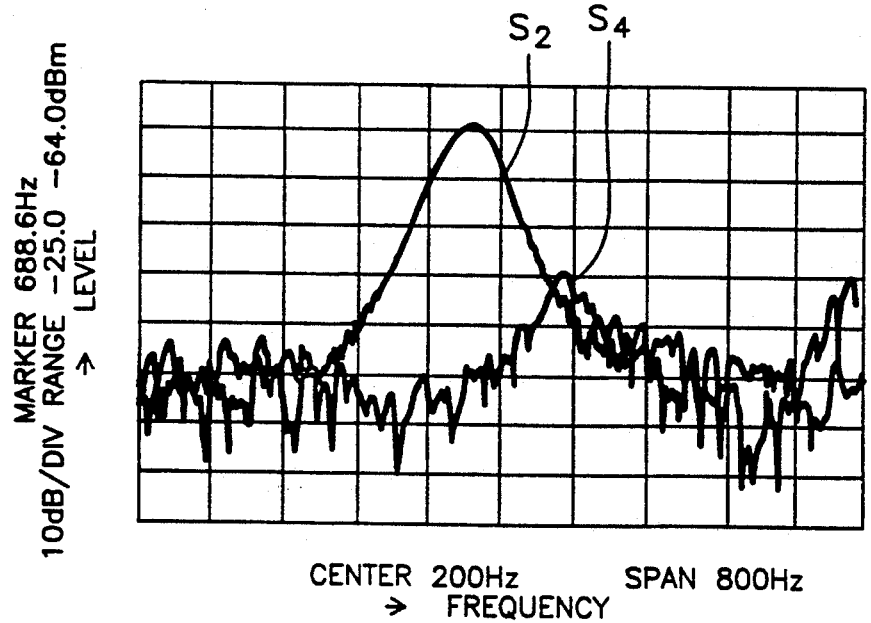
FIG. 3 is an illustration obtained by magnifying the level of the higher harmonics of the spectrogram of FIG. 2.

FIG. 3 shows the higher harmonics of FIG. 2 in an somewhat exaggerated manner.

In FIG. 3, S2 denotes the higher harmonics of the optical cable C1 and S4 denotes those of the optical cable C2.

As is apparent from FIG. 3, the frequencies of the higher harmonics S4 of the optical cable C2 are higher than the corresponding respective higher harmonics S2 of the optical cable C1 is the case of the fundamental waves by approximately double of the frequency difference of the fundamental waves or approximately 20 Hz.

According to the present invention, the optical cable C1 is identified by comparing the levels of the higher harmonics S2, S4 of the two optical cables C1, C2.

Note that the frequency difference of higher harmonics of a cross talk signal is greater than that of fundamental harmonics of the signal in different optical cables.

Therefore, the particular optical cable C1 can be identified without fault if a narrow bandwidth filter is used to single out the peak level of the higher harmonics S2 and that of the higher harmonics S4.

The transmitter/receiver set 11 to be used for the purpose of the present invention may be alternatively replaced by a transmitter set comprising a light source 12 and a receiver set comprising a light receiving device 13 and a photodetector 14, the transmitter set and receiver set being arranged at the opposite ends of a set of optical cables.

With such an arrangement, the operation of identify particular optical cable can be carried out by using a single mode optical fiber in each of the optical cables C1, C2 and the optical fibers for signal feedback 15 can be omitted.

The operator at the work site where the signal applying apparatus 16 can communicate with his colleague at the station where the output signal is received through a radio communication channel, using, for instance, a pair of transceiver sets, to make sure if the optical cable in question is detected or not as in the case where a conventional method is utilized.

FIELD OF INDUSTRIAL USE

When the method of the invention of identifying a particular optical cable out of a number of similar optical cables on the installation site by applying an external signal to the optical cables on a one by one basis is used, since the difference in the frequencies and the levels of the higher harmonics generated by the external signal in the particular cable and the surrounding cables that are laid so close to the particular cable that the phenomenon of cross talk unquestionably appears, the optical cable in question can be identified almost without fail.

Therefore, the method of identifying a particular optical cable according to the invention is effective and advantageous when it is used to single out a particular optical cable out of a set of optical cables which are laid close to one another.

What is claimed is:

1. A system for identifying a particular optical cable among a plurality of adjacent optical cables, the system comprising:
   transmitting means for transmitting optical signals in the form of polarized light through the plurality of optical cables;
   receiving means for receiving optical signals transmitted through the plurality of optical cables;
   means for sequentially applying mechanical vibrations at a predetermined frequency to each of plurality of optical cables, one optical cable at a time, at an intermediary point along a length of optical cables concurrently with transmission of optical signals by said transmitting means, thereby modulating optical signals in the optical cable to which the mechanical vibrations are applied, and any adjacent optical cables;
   means for identifying a particular optical cable among the plurality of optical cables by detecting the optical signals received by said receiving means and comparing levels of higher harmonics modulated optical signals in the particular cable with higher harmonics of modulated optical signals in the remainder of the plurality of optical cables, the particular optical cable being identified by the cable with the greatest level of higher harmonics of modulated optical signals.

2. The system of claim 1, wherein said transmitting means and said receiving means are connected to common ends of said plurality of optical cables.

3. The system of claim 1, wherein said transmitting and receiving means are connected to opposite ends of said plurality of optical cables.

4. A method for identifying a particular optical cable among a plurality of adjacent optical cables, the method comprising the steps of:
   transmitting optical signals in the form of polarized light through the plurality of optical cables;
   receiving optical signals transmitted through the plurality of optical cables;
   sequentially applying mechanical vibrations at a predetermined frequency to each of a plurality of optical cables, one optical cable at a time, at an intermediary point along a length of optical cables concurrently with transmission of optical signals, thereby modulating transmitted optical signals in the optical cable to which the mechanical vibrations are applied and any adjacent optical cables;
   identifying a particular optical cable among the plurality of optical cables by comparing levels of higher harmonics modulated optical signals in the particular optical cable with higher harmonics of modulated optical signals in the remainder of the plurality of optical cables, the particular optical cable being identified as the cable with the greatest level of higher harmonics of modulated optical signals.

* * * * *